Feb. 14, 1961  P. NEGRONI  2,971,566
PILOT SEATS FOR AIRCRAFT, MORE PARTICULARLY FOR HELICOPTER
Filed Jan. 26, 1959  4 Sheets-Sheet 2

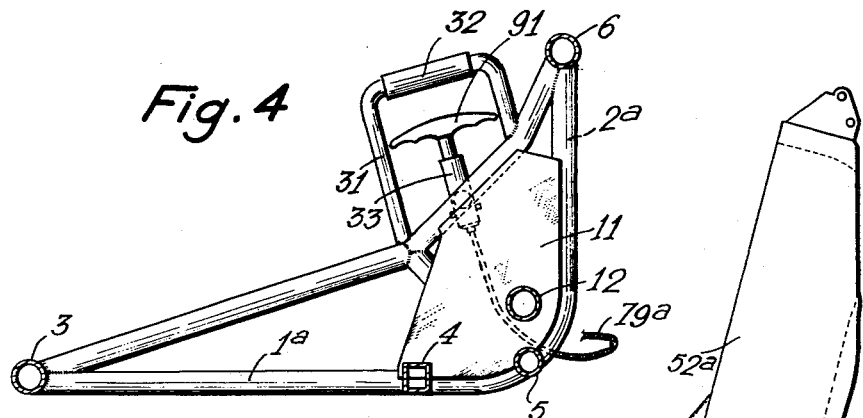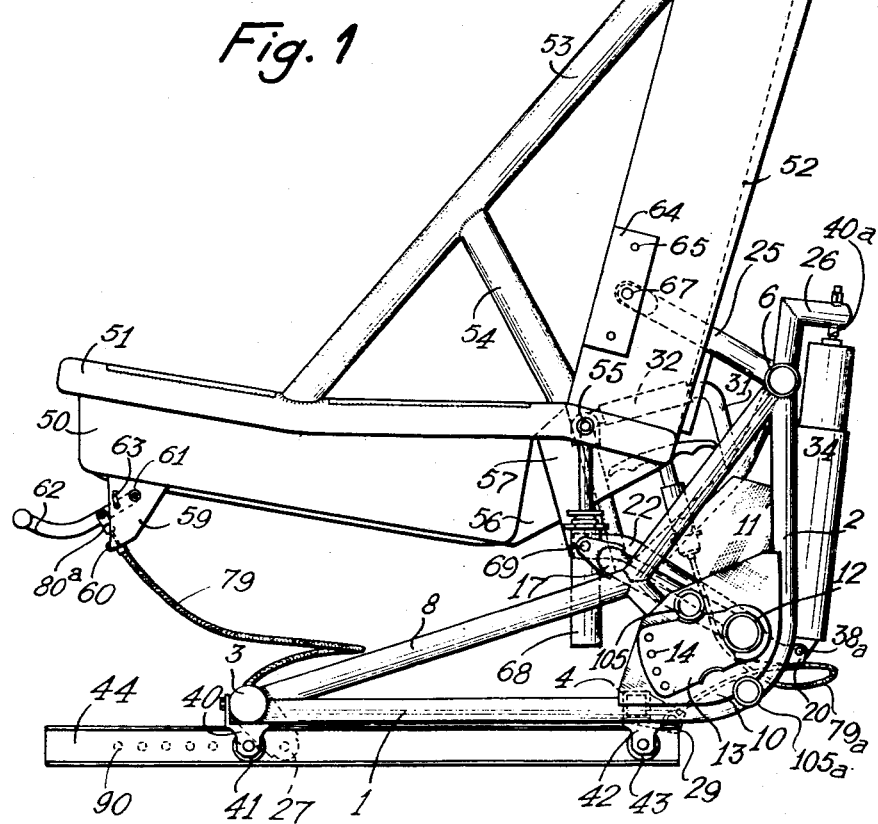

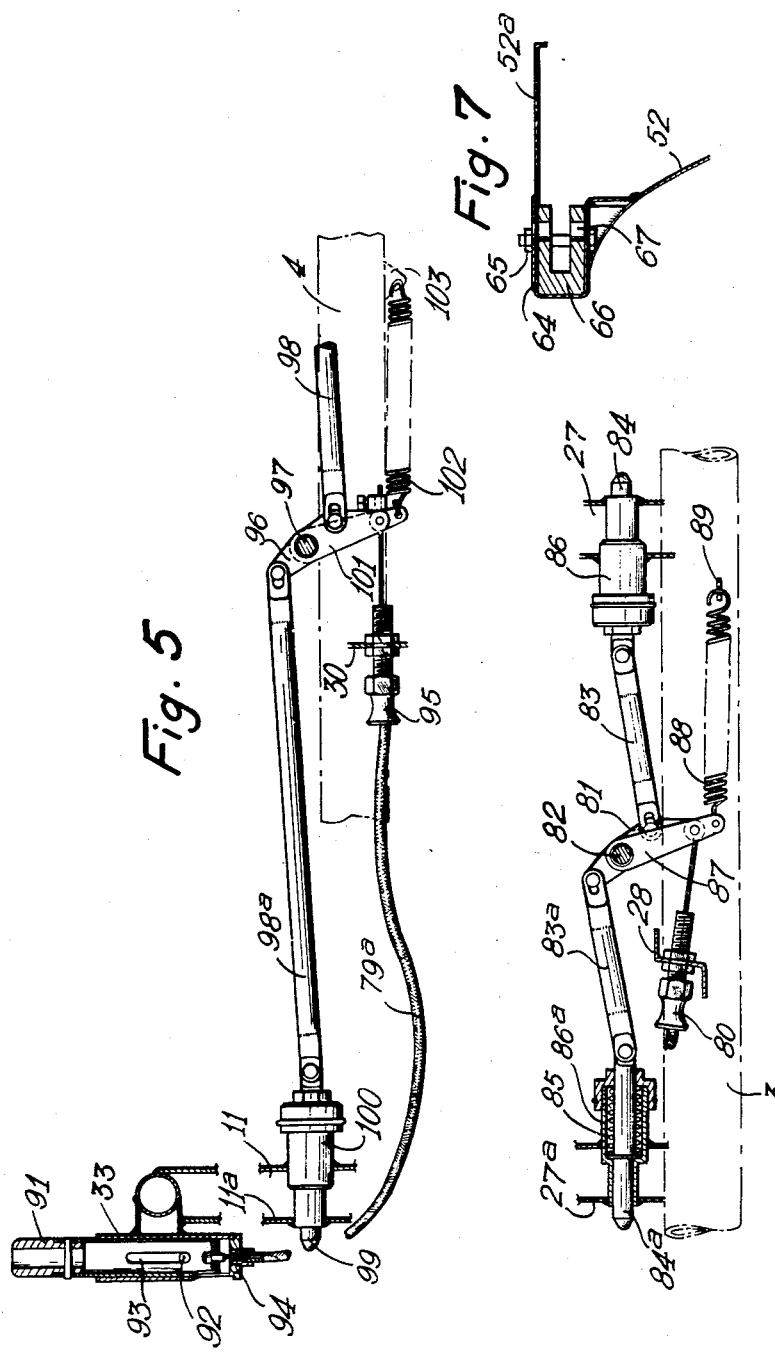

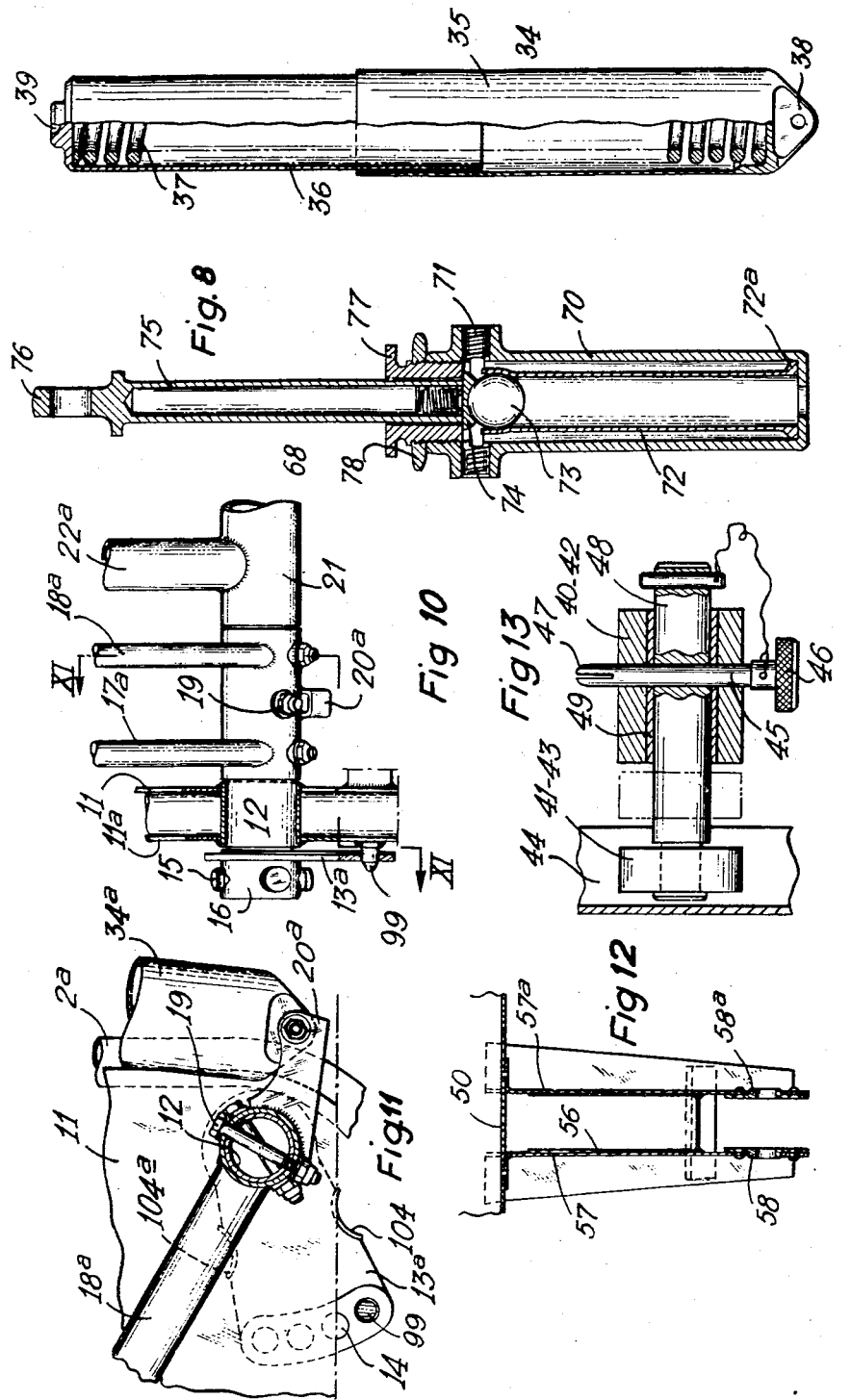

United States Patent Office 2,971,566
Patented Feb. 14, 1961

2,971,566
PILOT SEATS FOR AIRCRAFT, MORE PARTICULARLY FOR HELICOPTER

Pierre Negroni, Saint-Mandé, France, assignor to Sud-Aviation Societe Nationale de Constructions Aeronautiques, Paris, Seine, France Filed Jan. 26, 1959, Ser. No. 789,038

Claims priority, application France Jan. 27, 1958

8 Claims. (Cl. 155—9)

Seat position in the cockpit or pilot's cabin of an aircraft, relative to the controls, must be individually adjustable for each pilot according to his size, in order to facilitate piloting and avoid unnecessary fatigue.

Thus, it is customary for the pilot's seat to be equipped with two adjustment controls providing horizontal and vertical displacement of the seat, with, in certain systems, slight alteration of its rake as well.

The need for the pilot's seat to be adjustable for position proved to be even more vital on helicopters, for which such adjustable seats also have to meet special requirements imposed by the very particular flying characteristics of the helicopter, which are very different from those of conventional aircraft. For instance, in emergency landings, helicopter pilots are subjected to greater vertical decelerations than those which pilots of ordinary aircraft have to sustain, it being possible for such loads to reach 6 to 8 g, and there is a danger of pilots being injured as a result.

The present invention has for its object to overcome this drawback by the provision of an adjustable pilot's seat, more particularly for use in helicopters, of the type comprising two adjustment controls for horizontal and vertical displacement, in which the members providing the vertical displacement are associated to a device which alleviates the vertical shocks to which the pilot is subjected during descents in autorotation or as the result of vertical falls, this device preferably consisting of one or more shock-absorbers designed to provide non-return energy absorption.

In a preferred form of execution of the invention, the adjustable pilot's seat consists of a frame connected to the helicopter structure; a well-seat carrying the seat and backrest proper is mounted on this frame by means of a system of articulated parallelogram-type linkages attached to each side of the well-seat and by a further system of levers adjustable in position relative to the frame and carrying the shock-absorbers articulated on the well-seat, the whole assembly featuring a horizontal-position locking control and a position-adjustment control of these levers whereby the latter are made immovable with the frame.

Further characteristics of the present invention will become apparent from the following description taken in conjunction with the accompanying drawings, given by way of example only and not in any limiting sense, and which will make it clear how the invention can be put into practice.

In the drawings,

Fig. 1 is a side elevation of an adjustable seat for helicopters, according to the invention.

Fig. 4 is a sectional view of Fig. 3 along the line IV—IV.

Fig. 5 is a partly sectioned view in elevation, with partial cutaway, of the control for immobilising the levers on the frame.

Fig. 6 is a plan view of the control for immobilising the frame on the guide-rails.

Fig. 7 is a sectional view of the well-seat through the articulation point of one of the upper lever-arms of the parallelogram articulated on this well-seat.

Fig. 8 shows a radial section through one of the shock-absorbers equipping the seat shown in Fig. 1.

Fig. 9 is a partly sectional elevation view of a compensating device.

Fig. 10 is a partial front view of the main articulation shaft on the frame carrying the lower arms of the articulated parallelograms, the shock-absorber supporting lever arms and the sector for locking these levers on the chassis.

Fig. 11 is a sectional view through line XI—XI in Fig. 10.

Fig. 12 is a cross-sectional view of the articulation end-fitting of the lower arm of one of the parallelograms articulated on the well-seat.

Fig. 13 is a cross-sectional view showing the manner of assembly of the longitudinal guidance rollers.

Figure 2:
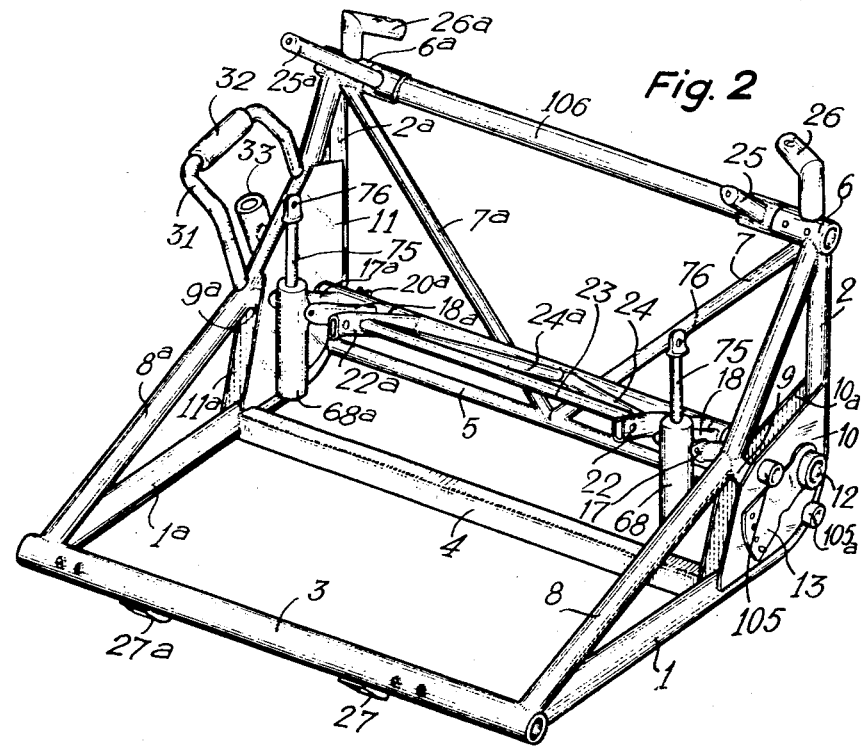
Fig. 2 is a perspective view of the bare frame of the pilot's seat shown in Fig. 1.
Figure 3:
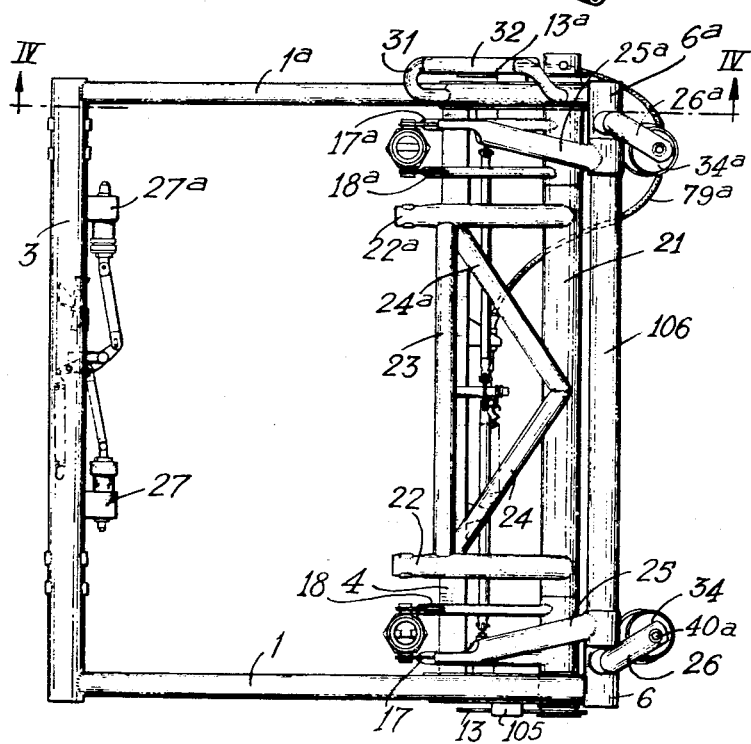
Fig. 3 is a plan view of the partially equipped frame of the seat shown in Fig. 1.

In the embodiment illustrated by the drawings, the adjustable seat comprises a frame (Figs. 1 to 4) consisting of two lateral tubes bent at right angles so as to form both the side-member 1 and 1a and vertical posts 2 and 2a. On these lateral tubes are welded a tubular front cross-piece 3, an intermediate square-section cross-piece 4, a lower rear tubular cross-piece 5 and two socket-type top rear supports 6 and 6a. The vertical posts 2 and 2a and the rear cross-piece 5 are connected together by tubular stays 7 and 7a. In addition, two bent lateral tubes 8 and 8a, welded to the front cross-piece 3, the vertical posts 2 and 2a and the supports 6 and 6a, provide the necessary lateral bracing through the medium of two stays 9 and 9a welded to these tubes and to tubes 1 and 1a. At the rear, this structure is equipped with two pairs of gussets 10—10a and 11—11a which are welded to it and which provide pivoting support for a main tubular articulation shaft 12.

To this main articulation tube 12 (see Figs. 3, 10 and 11), and outside of the frame, are fixed two sectors 13 and 13a provided with a plurality of apertures 14 disposed on a circular arc centered on the axis of said tube 12. Attachment of these sectors is by means of a set of bolts 15 which pass through the hub 16 of the sectors and through the tube 12. On this main tube 12, inside the frame and in proximity to gussets 10a and 11, two pairs of shock-absorber levers 17—18 and 17a—18a are fixed by means of bolts 19. Two forked levers 20 and 20a, directed rearwards, and the functions of which will be disclosed later, are welded to the hubs of these shock-absorber levers. Freely mounted on main tube 12, between the shock-absorber levers, is a structure consisting of a tube 21 to which are welded two lower levers 22 and 22a, cross-braced by a tube 23 and two tubular stays 24 and 24a. An upper articulation tube 106 is retained inside the supports 6 and 6a by means of cotter-pins.

On the upper rearward tube 106, constituting the upper articulation, are mounted two upper levers 25 and 25a having the same length as levers 22 and 22a. Supports 6 and 6a carry, in addition, two bent tubes 26 and 26a the functions of which will be disclosed hereinafter.

The frame structure further carries, welded on the front cross-piece 3, two channel-sectioned supports 27 and 27a and an intermediate support 28. An intermediate support 30 is also welded on the intermediate cross-piece 4. Lastly, on bent tube 8a, is welded a hand-rest 31 fitted with a grip 32 made of natural or synthetic rubber and with a socket 33 located substantially between the attachment points of hand-rest 31. The functions of these various elements will be defined later.

At the rear (see Fig. 3), the frame is equipped with compensating devices 34 and 34a, of the type illustrated in Fig. 9. Each of these consists of a lower cylinder 35, within which is slidable an upper cylinder 36, and a spring 37 bearing against the respective ends of these two cylinders. The lower cylinders are articulated, at 38, on the forked levers 20 and 20a. The ends of the upper cylinders 36 are provided with hemispherical seats 39 into which penetrate the heads of adjustment screws 40a fixed to the bent tubes 26 and 26a.

The front of the frame is also equipped with two supports 40 fitted with rollers 41, while, to the rear, substantially in register with the intermediate cross-piece 4, the frame carries two further supports 42 equipped with rollers 43. These rollers provide longitudinal displacement of the seat by cooperating with guide-rails 44 carried by the helicopter structure.

The assembly means used for rollers 41 and 43 provides for rapid dismantling of the seat without the use of tools. Each roller is fixed to the end of an axle 48 which is slidably mounted within a socket 49 carried by support 40 or 42, as the case may be. A removable spindle 45, provided with a knurled head 46 and a flexible stem 47, holds the roller in the operating position inside the channel-section guide-rails 44. As soon as spindle 45 is withdrawn, the rollers can be disengaged from the guide-rail to allow the seat to be dismantled.

The well-seat mounted on the frame comprises a lower portion 50 forming the seat proper and flanked by a flattened tube 51 which forms a frame for it and which extends rearwards beyond the well-seat to carry a backrest 52 comprising flanking portions 52a.

The seat frame formed by the flattened tube 51 is joined to these flanking portions 52a by a diagonal tube 53 and a tubular stay 54. Vertically beneath the backrest, this seat frame carries two bearings 55 whose functions will be disclosed hereinafter. The lower portion 50 is connected to the back of the backrest by two shrouds 56, made of folded sheet-iron, on each side of which are mounted two channel-section supports 57 and 57a equipped with flanges 58 and 58a.

Substantially underneath the front central part of the lower portion 50 of the well-seat is mounted a bearing-support 59 made of a strip of sheet-metal bent into the shape of a U and whose bottom is provided with a frontal lip 60. The sides of this support embody welded-in washers 61 which serve as bearings for the pivot of a lever 62 provided to control horizontal displacement of the seat, travel of this lever being restricted by a tongue projecting through a suitable aperture 63.

On the flanking portions 52a are fixed reinforcement strips 64 pierced by bolts 65 carrying fittings 66 which are provided with holes 67 mating with similar holes on the flanking portions 52a.

The well-seat described above is joined to the frame by a parallelogram linkage system constituted by the upper levers 25 and 25a articulated about 67 on the upper fittings 66 of the well-seat, and by the bottom levers 22 and 22a articulated on the two pairs of flanges 58 and 58a of said well-seat. Such an assembly, however, would tend to drop floorwards. To maintain it in position, use is made, on the one hand, of two shock-absorbers 68 and 68a the bodies 70 of which are articulated about 69 on the two pairs of shock-absorber levers 17—18 and 17a—18a the rods 75 of said shock-absorbers being articulated on bearings 55 of the well-seat and, on the other, of a device allowing sectors 13 and 13a to be locked in relation to the frame.

As shown in Fig. 8, each shock-absorber 68 consists of a body 70 embodying two diametrically opposed threaded holes 71 to allow the shock-absorbers to pivot, about 69, on the pairs of shock-absorber levers. Inside this body 70, is housed a tube 72 resting against the bottom of the body via an annular flange 72a. The upper flared end of this tube 72 accommodates a ball 73 against which bears a thrust-screw 74 carried inside a hollow piece 75 terminating in an eye 76 which articulates on the bearings 55. The thrust-screw 74 and the hollow piece 75 are held in position by a threaded hollow cap 77 and a nut 78.

The horizontal adjustment device for the seat is illustrated in Figs. 1 and 6.

This device consists in a cable 79 housed in a flexible sheath, such as the one known under the trademark "Bowden cable" which cable is connected to lever 62 via a yoke 80a, the cable passing through an aperture in the bottom of the support 59, the underneath of which acts as an abutment for the cable sheath. The other end of this sheath fits into the recessed head of a hollow screw 80 fixed to the fitting 28, while the inner cable extends outwards from this sheath up to a beam-lever 81 pivoting about an axle 82 carried by the front cross-piece 3. On this beam-lever are articulated two rods 83 and 83a acting upon two plungers 84 and 84a against the action of springs 85 accommodated in housings 86 and 86a integral with the channel-section supports 27 and 27a. A lever 87 integral with the axle 82, has its end connected to a return spring 88 the other extremity of which is anchored to a suitable fitting 89 welded to the front cross-piece 3.

On pulling lever 62 upwards, the pilot acts upon cable 79 and causes withdrawal of plungers 84 and 84a which previously penetrated into holes 90 let into the guide-rails 44. The pilot is thus able to displace the seat by a rolling action of the rollers 41 and 43 along these guide-rails 44 and, once he has positioned the seat as required, he releases lever 62; under the combined action of return-spring 88 and the sheath of the flexible cable, plungers 84 and 84a locate once more with the holes 90 in guide-rails 84 corresponding to the fresh position of the seat.

Vertical displacement of the adjustable seat, together with simultaneous locking of sectors 13 and 13a, is achieved by means of the device illustrated in Figs. 1, 3, 4 and 5.

This device comprises a plunger handle 91 slidably mounted in the socket 33 and whose travel is limited by a tongue 92 integral with the socket projecting through an appropriate aperture 93 in the handle. The bottom end of this handle is connected to a cable 79a housed in a flexible sheath which abuts against the bottom 94 of socket 33. The other end of this sheath abuts inside a hollow screw 95 fixed to the fitting 30, the inner cable extending to one end of a beam-lever 96 integral with an axle 97 carried by the intermediate cross-piece 4. On this beam-lever are articulated two rods 98 and 98a controlling two plungers 99 acting against springs which, as in the case represented in Fig. 6, are accommodated in housings 100 integral with the gussets 10 and 10a on one side, and 11 and 11a on the other. A lever 101 integral with axle 97 has its extremity connected to a return-spring 102 the other end of which is anchored to a suitable fitting welded to the intermediate cross-piece 4.

To displace his seat vertically, the pilot locks his fingers round handle 91, while the palm of his hand rests against the rubber grip 32 of hand-rest 31. The pull thus exerted on cable 79a results in the withdrawal back into housings 100 of plungers 99, which previously penetrated into one of the holes 14 in sectors 13 and 13a. Under the action of the weight of his body, partly counterbalanced by compensating devices 34 and 34a, the pilot can adjust his seat for height as required, the height to which the seat has been adjusted being maintained after release of handle 91 by penetration of plungers 99 into the holes 14 in sectors 13 and 13a corresponding to the fresh position of the seat. Travel of these sectors is restricted by the abutment of two notches 104 and 104a, provided along the two edges of each sector, against two tubular stops 105 and 105a carried by the gussets 10 and 11a.

In the layout described above, forces applied to the seat are transmitted to the frame via the balls 73 in the shock-absorbers. Stresses resulting from normal flight manoeuvres of the helicopter will not result in further embedding of the balls 73 by deformation of the tubes 72. If, however, the load exerted by the pilot's body as the result of sudden acceleration or deceleration should exceed a dangerous value, the balls 73 are forcibly thrust into the tubes 72 which deform under the strain. The seat is lowered, but part of the energy involved is absorbed by this deformation process of tubes 72, and the shock sustained by the pilot is thus alleviated.

What I claim is:

1. A pilot's seat for aircraft, more particularly for helicopter, adjustable in position according to the size of the pilot, comprising, in combination, a frame longitudinally displaceable on the aircraft structure, means secured on the aircraft for supporting said frame, a well-seat carrying the seat and backrest proper, a pair of articulated parallelogram linkage means fixed to either side of said well-seat and to said frame, levers articulated on said frame and adjustable with respect to said frame in vertical planes, shock-absorbers interposed between the free ends of said levers and said well-seat, a control device for locking said frame with respect to the means for supporting it, and a control device for locking said levers with respect to said frame.

2. A pilot's seat for aircraft, more particularly for helicopter, adjustable in position according to the size of the pilot, comprising, in combination, a frame longitudinally displaceable on the aircraft and having a rear top cross-piece, means secured on the aircraft for supporting said frame, a well-seat carrying the seat and backrest proper, a main transverse articulation tube pivotally mounted on said frame, a pair of upper levers pivotally mounted on either side of said well-seat and on the rear top cross-piece, a pair of lower levers having a length equal to that of said upper levers and pivotally mounted on either side of said well-seat and on said main transverse tube, levers fixed on the said main transverse tube and adjustable with respect to said frame in vertical planes, shock-absorbers interposed between the free ends of said last levers and said well-seat, a control device for locking said frame with respect to the means for supporting it, and a control device for locking said main transverse tube with respect to said frame.

3. A pilot's seat according to claim 2, wherein each shock-absorber comprises a casing articulated on the free end of the corresponding lever fixed on the main transverse tube, a tube housed in said casing having an annular flange which bears against the bottom of said casing and a flared portion at its upper end, a ball housed in said flared portion of the tube, a cap with a central hole mounted on said casing, a tubular member articulated on the well-seat and slidably mounted through said central hole, and a thrust-screw mounted on the lower portion of said tubular member and having a head which bears against said ball.

4. A pilot's seat according to claim 2, wherein the control device for locking the main transverse tube with respect to the frame comprises two sectors fixed on said main transverse tube and provided with rows of holes respectively disposed on circular arcs centered on the axis of said tube, two transverse plungers slidably mounted on the frame in register with said circular arcs, respectively, two springs carried by said frame and adapted to respectively push said plungers through one of the holes of said sectors, transmission means interconnecting said plungers and adapted to displace them in reverse direction in order to retract said plungers from said holes against the action of said springs, a flexible sheathed cable connected at one of its ends to said transmission means, a handle laterally mounted on said frame for vertical reciprocal displacement and connected to the other end of said flexible sheathed cable, a return spring interconnecting said transmission means and said frame, and a hand-rest integral with said frame and disposed over said handle.

5. A pilot's seat according to claim 2, further comprising a pair of levers secured on the main transverse tube and compensating devices interposed between the free ends of said levers and the frame.

6. A pilot's seat for aircraft, more particularly for helicopter, adjustable in position according to the size of the pilot, comprising, in combination, a frame longitudinally displaceable on the aircraft structure, longitudinal guiding rails mounted on the aircraft structure and having rows of holes respectively aligned along longitudinal lines, removable rollers mounted under the frame and engaging said rails for rolling thereon, a well-seat carrying the seat and backrest proper, a pair of articulated parallelogram linkage means fixed to either side of said well-seat and to said frame, levers articulated on said frame and adjustable with respect to said frame in vertical planes, shock-absorbers interposed between the free ends of said levers and said well-seat, a control device for locking said frame with respect to said rails, and a control device for locking said levers with respect to said frame.

7. A pilot's seat according to claim 6, wherein the control device for locking the frame with respect to the rails comprises two transverse plungers slidably mounted on the frame in register with said longitudinal lines, respectively two springs carried by said frame and adapted to respectively push said plungers through one of the holes of said rails, transmission means interconnecting said plungers and adapted to displace them in reverse direction in order to retract said plungers from said holes against the action of said springs, a flexible sheathed cable connected at one of its ends to said transmission means, a handle pivotally mounted under the front part of the well-seat and connected to the other end of said flexible sheathed cable, and a return spring interconnecting said transmission means and said frame.

8. A pilot's seat for aircraft, more particularly for helicopter, adjustable in position according to the size of the pilot, comprising, in combination, a frame longitudinally displaceable on the aircraft and having a rear top cross-piece, longitudinal guiding rails mounted on the aircraft structure and having rows of holes respectively alinged along longitudinal lines, removable rollers mounted under the frame and engaging said rails for rolling thereon, a well-seat carrying the seat and backrest proper, a main transverse articulation tube pivotally mounted on said frame, a pair of upper levers pivotally mounted on either side of said well-seat and on the rear top cross-piece, a pair of lower levers having a length equal to that of said upper levers and pivotally mounted on either side of said well-seat and on said main transverse tube, levers fixed on said main transverse tube and adjustable with respect to said frame in vertical planes, shock-absorbers interposed between the free ends of said last levers and said well-seat, two transverse plungers slidably mounted on the frame in register with said longitudinal lines, respectively, two springs carried by said frame and adapted to respectively push said plungers through one of the holes of said rails, transmission means interconnecting said plungers and adapted to displace them in reverse direction in order to retract said plungers from said holes against the action of said springs, a flexible sheathed cable connected at one of its ends to said transmission means, a handle pivotally mounted under the front part of the well-seat and connected to the other end of said flexible sheathed cable, and a return spring interconnecting said transmission means and said frame, two sectors fixed on said main transverse tube and provided with rows of holes respectively disposed on circular arcs centered on the axis of said tube, two other transverse plungers slidably mounted on the frame in register with said circular arcs, respectively, two other springs carried by said frame and adapted to respectively push said other plungers through one of the holes of said sectors, a second transmission means interconnecting said other plungers and adapted to displace them in reverse direction in order to retract said plungers from said sector holes against the action of said other springs, a second flexible sheathed cable connected at one of its ends to said second transmission means, a second handle laterally mounted on said frame for vertical reciprocal displacement and connected to the other end of said second flexible sheathed cable, a second return spring interconnecting said transmission means and said frame, and a hand-rest integral with said frame and disposed over said second handle.

References Cited in the file of this patent

UNITED STATES PATENTS

| | | |
|---|---|---|
| 2,682,931 | Young | July 6, 1954 |
| 2,710,047 | Duppstadt | June 7, 1955 |
| 2,714,001 | Hersey et. al. | July 26, 1955 |
| 2,857,056 | Dilworth | Oct. 21, 1958 |

FOREIGN PATENTS

| | | |
|---|---|---|
| 10,985 | France | Aug. 29, 1895 |
| 675,982 | Germany | May 23, 1939 |
| 541,116 | Canada | May 21, 1957 |